United States Patent
Peng et al.

(10) Patent No.: US 9,483,071 B2
(45) Date of Patent: Nov. 1, 2016

(54) DISPLAY DEVICE AND METHOD FOR ASSEMBLING THE SAME

(71) Applicants: Cheng-Chao Peng, Taipei (TW); Ke-Sheng Huang, Taipei (TW); Yung-Chih Kuo, Taipei (TW); Chih-Wei Chang, Taipei (TW); Wen-Hua Yu, Taipei (TW); Yu-Yi Wu, Taipei (TW); Yu-Yuan Lin, Taipei (TW)

(72) Inventors: Cheng-Chao Peng, Taipei (TW); Ke-Sheng Huang, Taipei (TW); Yung-Chih Kuo, Taipei (TW); Chih-Wei Chang, Taipei (TW); Wen-Hua Yu, Taipei (TW); Yu-Yi Wu, Taipei (TW); Yu-Yuan Lin, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 189 days.

(21) Appl. No.: 14/108,339

(22) Filed: Dec. 17, 2013

(65) Prior Publication Data

US 2015/0173225 A1   Jun. 18, 2015

(51) Int. Cl.
 *H05K 7/00* (2006.01)
 *H05K 5/00* (2006.01)
 *G06F 1/16* (2006.01)
 *G02F 1/1333* (2006.01)

(52) U.S. Cl.
 CPC ........... *G06F 1/16* (2013.01); *G02F 1/133308* (2013.01); *G02F 2001/133317* (2013.01); *G02F 2001/133322* (2013.01); *G02F 2001/133325* (2013.01); *Y10T 29/49826* (2015.01)

(58) Field of Classification Search
 CPC .................. G02F 1/13308; H05K 7/1438
 USPC ........................ 361/679.01–679.21
 See application file for complete search history.

(56) References Cited

U.S. PATENT DOCUMENTS

2005/0195560 A1* 9/2005 Kim .................. G02F 1/133308
                                                        361/679.27
2009/0237586 A1* 9/2009 Han .................. G02F 1/133308
                                                        349/58

FOREIGN PATENT DOCUMENTS

CN      1444071       9/2003
CN     101539675      9/2009

OTHER PUBLICATIONS

"Office Action of Taiwan Counterpart Application", issued on Nov. 25, 2015, p. 1-p. 7.

* cited by examiner

Primary Examiner — Jerry Wu
(74) Attorney, Agent, or Firm — Jianq Chyun IP Office

(57) ABSTRACT

A display device comprises a cover and a display module. The cover includes a bottom plate and at least one cover limit element. The cover limit element projects inwardly from an inner surface of the bottom of the cover. A space is formed between the bottom plate and the cover limit element. The display module includes a frame with at least one frame limit element disposed at an end of the frame and projecting at a position between the cover limit element and the bottom plate. The frame limit element is configured to be disposed in the space and between the cover limit element and the bottom plate to retain the display module with the cover.

10 Claims, 10 Drawing Sheets

DISPLAY DEVICE AND METHOD FOR ASSEMBLING THE SAME

TECHNICAL FIELD

The present invention relates generally to a display module, and more particularly to a display module used in a display device.

BACKGROUND

With development of semiconductor devices and display techniques, electronic products are continually developed towards miniaturization, multi-function and easy to carry. The most commonly used portable electronic products include notebook computers, tablet computers and mobile phones, etc. The user can carry and use the notebook computer in many places, not only at home and at the office but also in public places.

FIG. 1A illustrates a front view of a display device 100 of related art. FIG. 1B illustrates an exploded view of the display device 100 in FIG. 1A. The display device 100 includes a cover 102 and a display module 104. The display module 104 includes a frame 106 and a panel module 108. FIG. 1C illustrates a cross-sectional view of the display device 100 after the display module 104 is assembled to the cover 102. FIG. 1D illustrates an enlarged view of a left part of the display device 100 of FIG. 1C. When assembled, a force is applied directly to the display module 104 in direction A, thus allowing a projection 114 of the frame 106 to move past a corresponding projection 110 of the cover 102. Once the projection 114 is underneath the corresponding projection 110 and into a notch 112, the display module 104 and frame 106 are fixed to the cover 102.

SUMMARY OF THE INVENTION

A display device comprises a cover and a display module comprising a panel module and a frame. The cover includes a bottom plate and at least one cover limit element. The cover limit element projects inwardly from an inner surface of the bottom of the cover. A space is formed between the bottom plate and the cover limit element. The display module includes a frame with at least one frame limit element disposed at an end of the frame and projecting at a position between the cover limit element and the bottom plate. The frame limit element is configured to be disposed in the space and between the cover limit element and the bottom plate to retain the display module with the cover.

A method of assembling a display device providing the display module and the cover, sliding the display module along a plane parallel to the cover and inserting the frame limit element into the space between the cover limit element and the bottom plate to retain the display module with the cover.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. For example, "lower" and "underneath" is not limited to a particular side; "lower" could be "higher" when view direction is changed. Like numbers refer to like elements throughout.

Figure 1A:
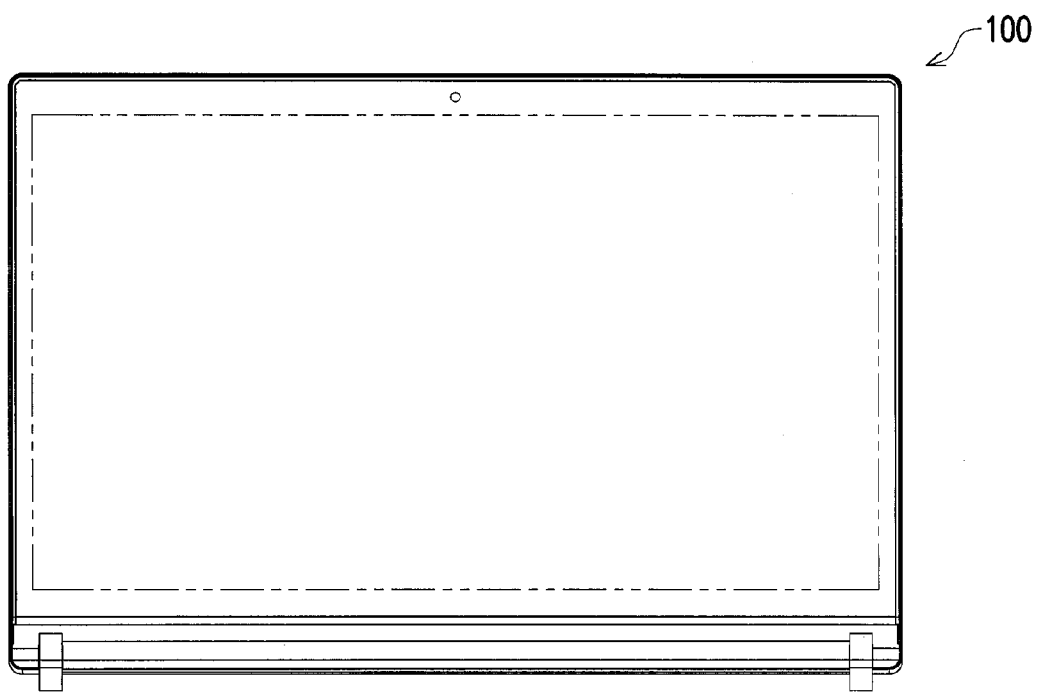
FIG. 1A illustrates a front view of a display device of related art.
Figure 1B:
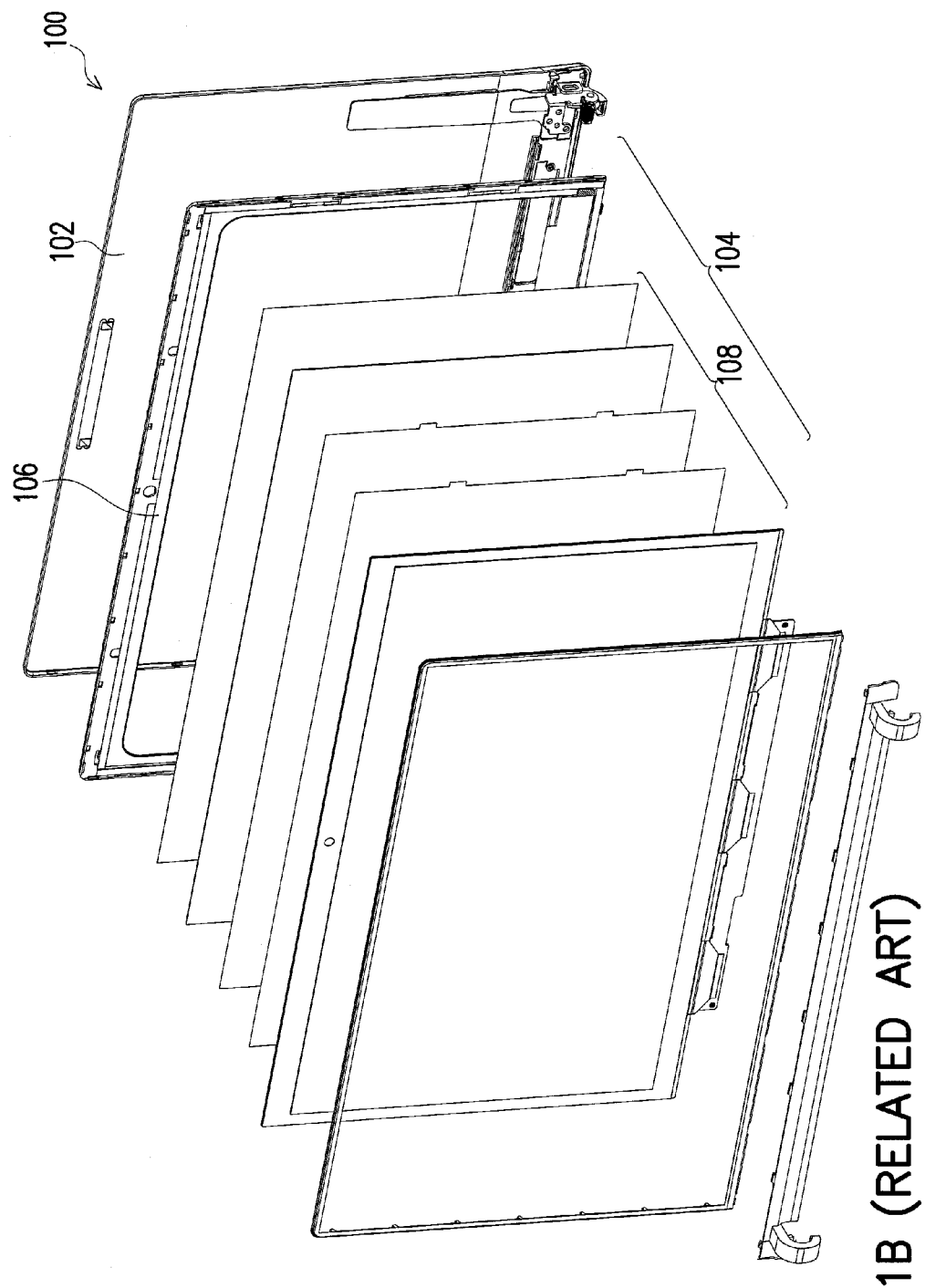
FIG. 1B illustrates an exploded view of the display device in FIG. 1A.
Figure 1C:
FIG. 1C illustrates a cross-sectional view of the display device of FIG. 1B.
Figure 1D:
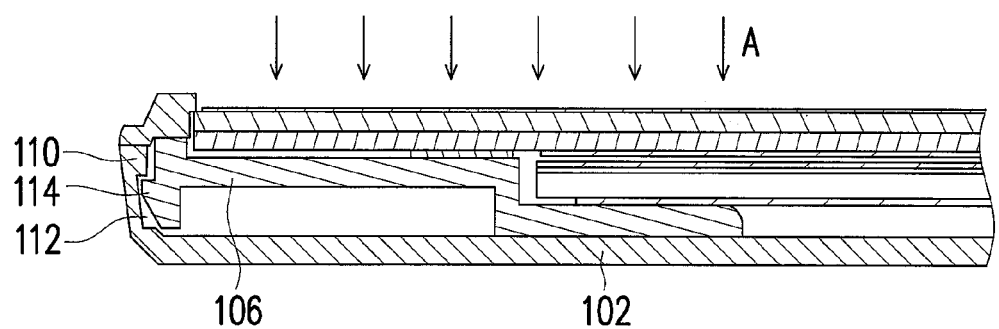
FIG. 1D illustrates an enlarged view of a left part of the display device of FIG. 1C.
Figure 2A:
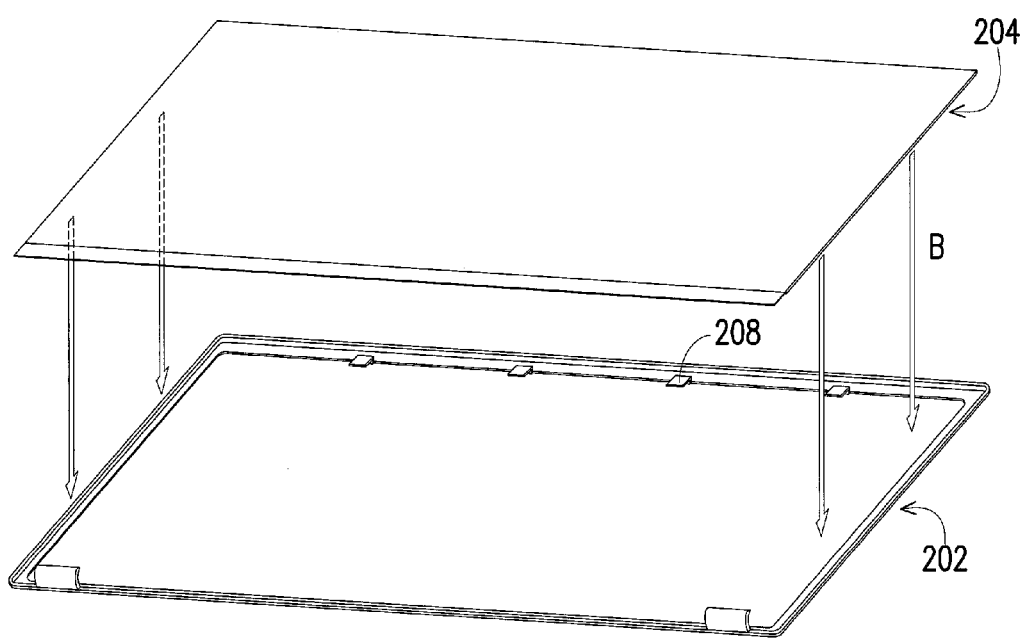
FIG. 2A illustrates a top perspective view of a display module and a cover prior to assembly according to an exemplary embodiment of the present invention.

FIG. 2A illustrates a top perspective view of a display module 204 and a cover 202 prior to assembly. The display module 204 is disposed to the cover 202 in direction B.

Figure 2B:
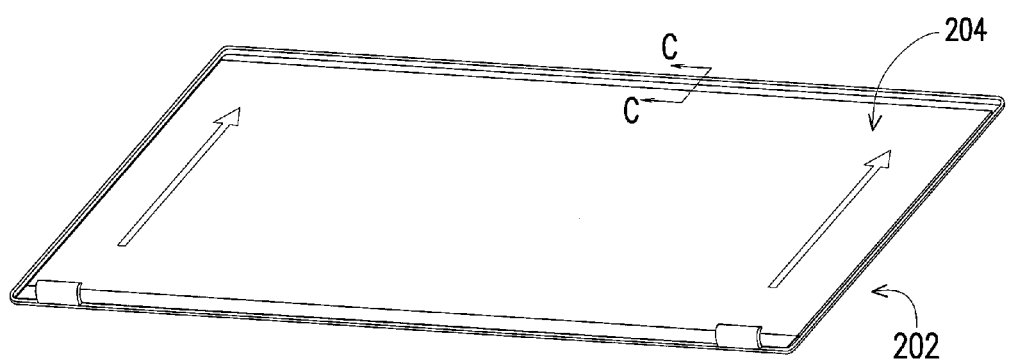
FIG. 2B illustrates a top perspective view of the display module and the cover of FIG. 2A during assembly.
Figure 2C:
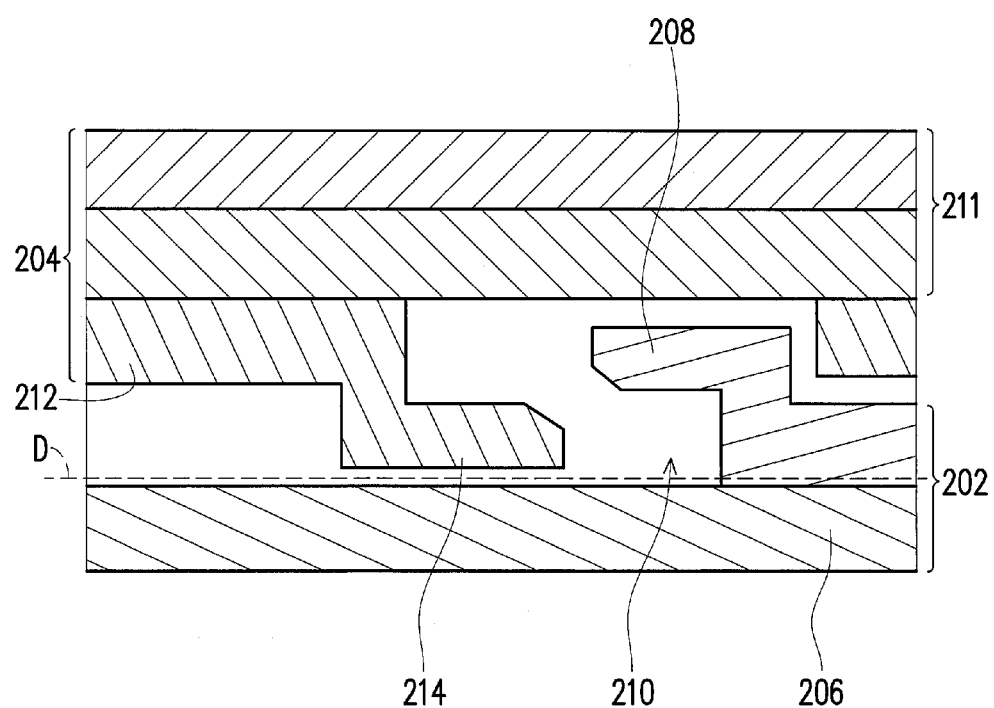
FIG. 2C illustrates a cross-sectional view of the cover and the display module of FIG. 2B taken along line C-C in a non-assembled state.
Figure 2D:
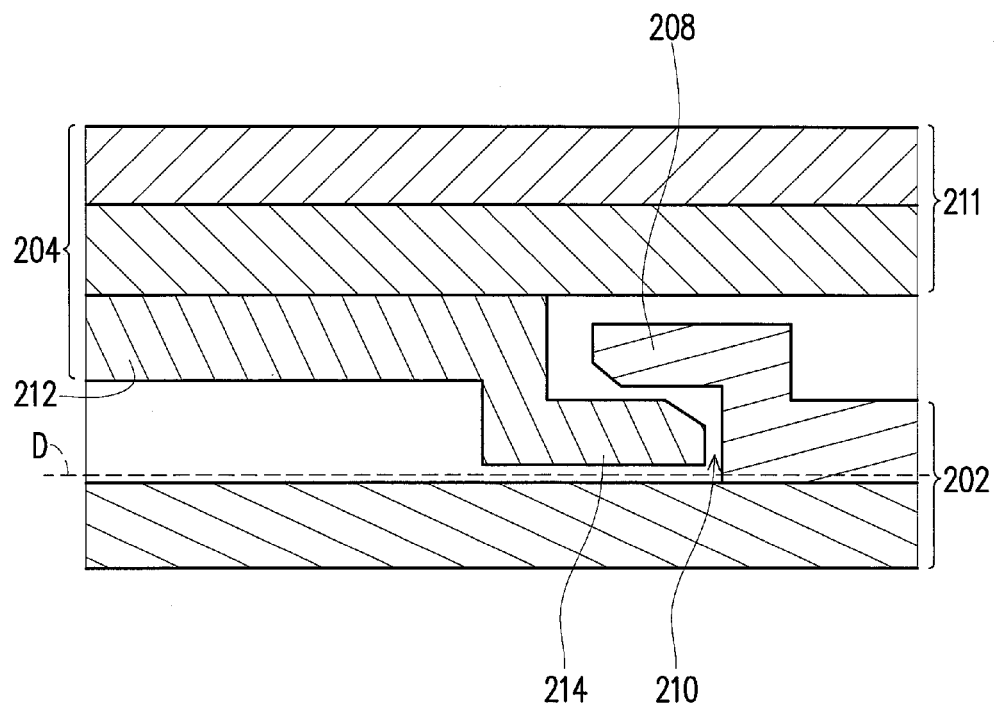
FIG. 2D illustrates a cross-sectional view of the cover and the display module of FIG. 2C in an assembled state.

FIG. 2B illustrates a top perspective view of the display module 204 disposed on the cover 202. FIG. 2C illustrates a cross-sectional view of the cover and the display module of FIG. 2B taken along line C-C. Referring to FIG. 2C, the cover 202 comprises a bottom plate 206 and a cover limit element 208. The cover limit element 208 may be protruding inwardly from the inner surface of the cover 202. A space 210 is formed between the bottom plate 206 and the cover limit element 208. The cover limit element 208 may be in any form, such as a projection, a hook, a tab or the like. The display module 204 may comprise a panel module 211 and a frame 212. The frame 212 may comprise a frame limit element 214 formed at an end of the frame 212 and at a lower position than the cover limit element 208. The frame limit element 214 may be in any shape so long as it can be accommodated by the space 210 and be retained by the cover limit element 208. When the display module 204 slides along a plane D that is substantially parallel to the cover 202, the frame limit element 214 may be inserted into the space 210. FIG. 2D illustrates a cross-sectional view of the display module 204 assembled with the cover 202. As illustrated, the frame limit element 214 is inserted into the space 210 formed between the cover limit element 208 and the cover 202. The movement of the display module 204 to engage and retained with the cover 202 is limited by the cover limit element 208 and the space 210. The display module 204 is thus retained with the cover 202. Since the display module 204 is retained with the cover 202 by sliding it into the space 210, no orthogonal force is exerted to the display module 204 to force corresponding projection of the display module 204 and the cover 202. The cover limit element 208 and the frame limit element 214 may each be one long, or plurality of individual pieces.

Figure 2E:
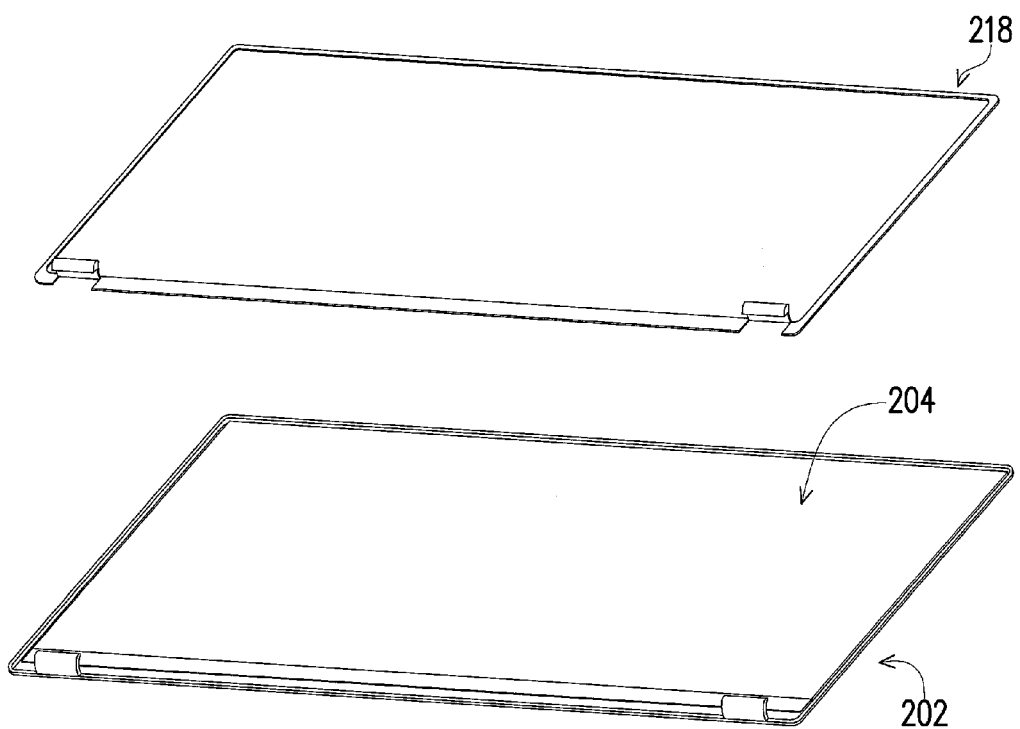
FIG. 2E illustrates a top perspective view of a bezel assembled with the cover and the display module of FIG. 2B.

In addition to the engagement between the cover limit element 208 and the frame limit element 214, the display module 204 may be secured to the cover 202 by panel fastening elements, such as screws, washers, rivets, nuts and like fasteners. A bezel 218 may then be disposed to the cover 202, as illustrated in FIG. 2E. The bezel 218 may be secured to the cover 202 by bezel fastening elements, such as screws, washers, rivets, nuts and like fasteners.

Figure 3:
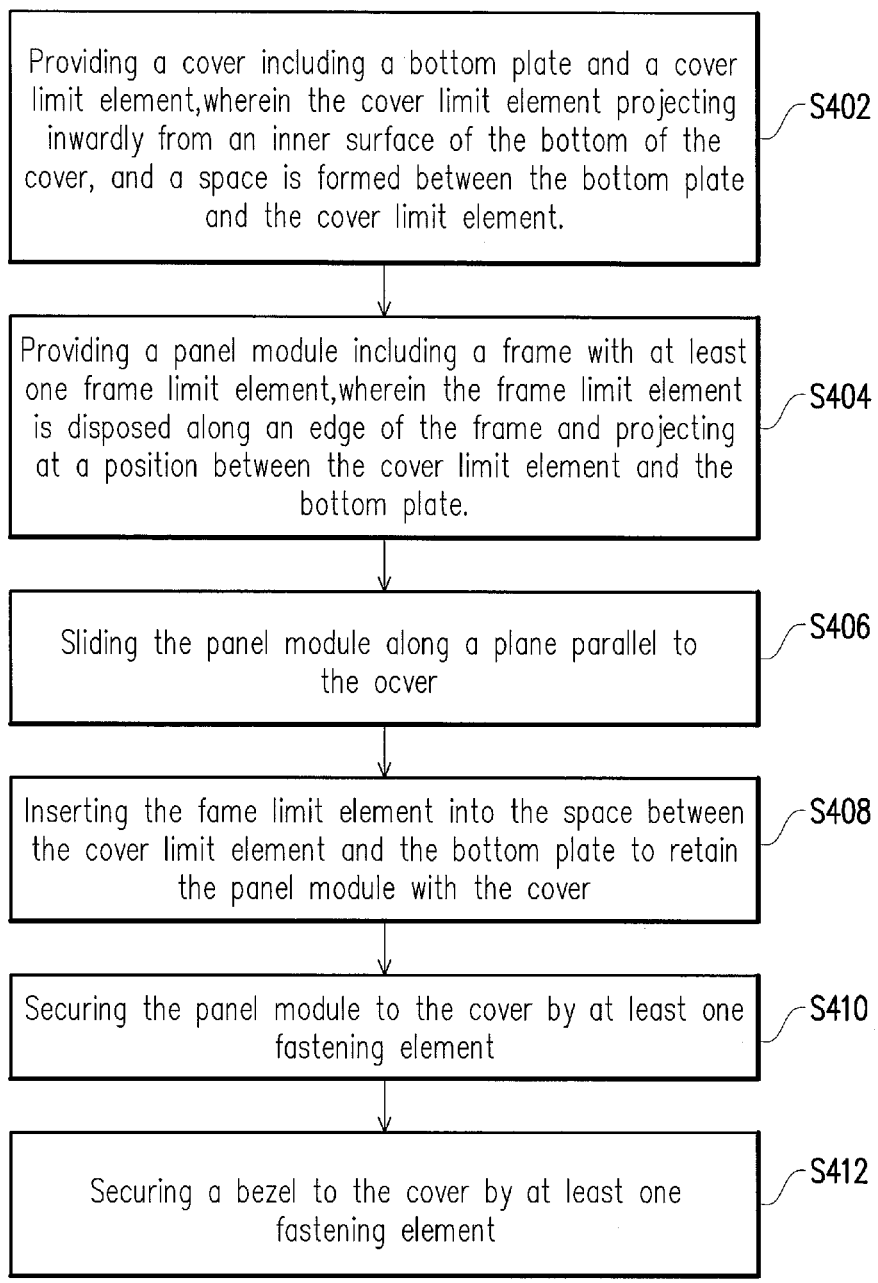
FIG. 3 is a flow chart illustrating a method of assembling a display device according to an embodiment of the invention.

FIG. 3 is a flow chart illustrating a method of assembling a display device according to an embodiment of the invention. With reference to FIGS. 2C and 2D, the cover 202 has the bottom plate 206 and at least one cover limit element, e.g., the cover limit element 208. The cover limit element 208 projects inwardly from an inner surface of the bottom plate 206 of the cover 202. A space 210 is formed between the bottom plate 206 and the cover limit element 208. The display module 204 includes a frame 212 with at least one frame limit element, e.g., the frame limit element 214, disposed at an end of the frame 212 projecting at a lower position between the cover limit element 208 and the bottom plate 206. At steps S402 and S404 illustrated in FIG. 3, the cover 202 and the display module 204 are provided. The display module 204 slides along a plane parallel to the cover 202 at step S406. The frame limit element 214 is inserted into the space 210 between the cover limit element 208 and the bottom plate 206 to retain the display module 204 with the cover 202 at step S408. At step S410, the panel module 211 is secured to the cover 202 by at least one fastening element. At step S412, a bezel 218 is secured to the cover 202 by at least one fastening element.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A display device, comprising: a cover having a bottom plate and at least one cover limit element, the cover limit element projecting inwardly in a first direction from an inner surface of the bottom plate of the cover, the first direction is parallel to the inner surface, and a space being formed between the bottom plate and the cover limit element; and a display module including a panel module and a frame, the frame comprising at least one frame limit element disposed at an end of the frame and projecting at a position between the cover limit element and the bottom plate, and a space being formed between the frame and the frame limit element to receive the cover limit element; wherein the display module slides along a plane parallel to the inner surface of the bottom plate in a second direction opposite to the first direction so that the frame limit element is configured to be disposed in the space and between the cover limit element and the bottom plate, without orthogonal force, to retain the display module with the cover.

2. The display device of claim 1, wherein the display module being supported by the frame.

3. The display device of claim 1, wherein the display module is secured to the cover by at least one fastening element.

4. The display device of claim 1, further comprising a bezel secured to the display module by at least one fastening element.

5. The display device of claim 1, wherein the cover limit element comprises at least one of a projection, hook and tab.

6. The display device of claim 1, wherein the frame limit element comprises at least one of projections, hooks and tabs.

7. A method of assembling a display device comprising: providing a display module and a cover, wherein the cover has a bottom plate and at least one cover limit element and the display module has a panel module and a frame, the cover limit element projects inwardly in a first direction from an inner surface of the bottom plate of the cover, and the first direction is parallel to the inner surface, wherein the frame has at least one frame limit element disposed at an end of the frame, and a space being formed between the frame and the frame limit element to receive the cover limit element; and sliding the display module along a plane parallel to the inner surface of the bottom plate in a second direction opposite to the first direction so that the frame limit element is inserted into a space between the cover limit element and the bottom plate, without orthogonal force, to retain the display module with the cover.

8. The method of claim 7, wherein the frame limit element projects at a lower position between the cover limit element and the bottom plate.

9. The method of claim 7, further comprising securing the display module to the cover by at least one fastening element.

10. The method of claim 7, further comprising securing a bezel to the cover by at least one fastening element.

* * * * *